Sept. 15, 1925.  D. F. O'BRIEN  1,553,953
HYDRANT
Filed March 30, 1922
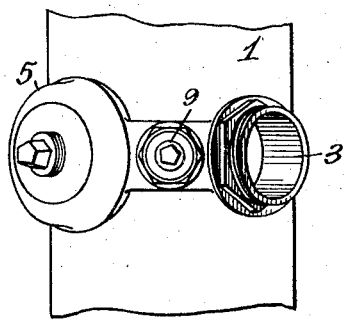
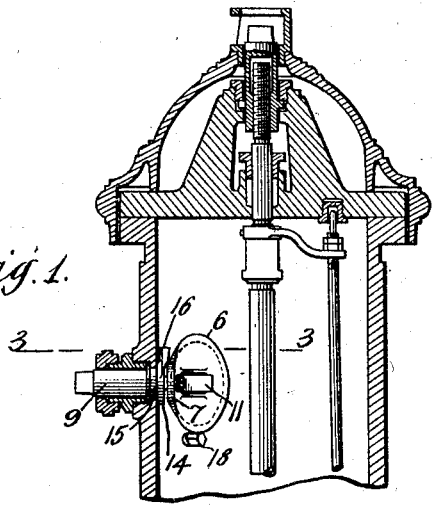
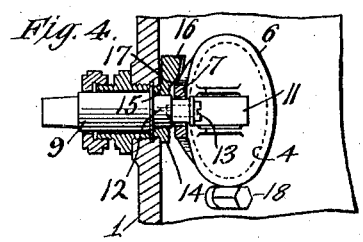
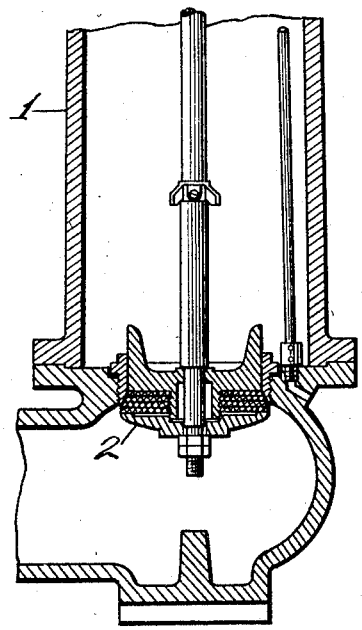
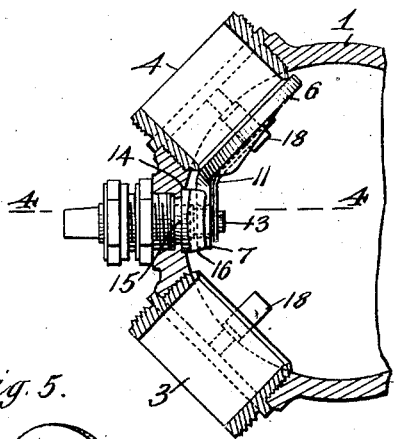
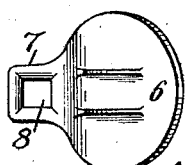
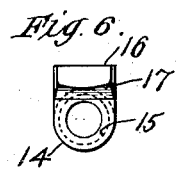
Inventor
Denis F. O'Brien
By his Attorneys Patented Sept. 15, 1925.

1,553,953

UNITED STATES PATENT OFFICE.

DENIS F. O'BRIEN, OF EAST ORANGE, NEW JERSEY.

HYDRANT.

Application filed March 30, 1922. Serial No. 547,966.

*To all whom it may concern:*

Be it known that I, DENIS F. O'BRIEN, a citizen of the United States, residing at East Orange, county of Essex, and State of New Jersey, have invented certain new and useful Improvements in Hydrants, fully described and represented in the following specification and the accompanying drawings, forming a part of the same.

This invention relates to improvements in compression hydrants, and more particularly to hydrants of this class which are provided with two nozzles located in close proximity to each other and a shut-off valve common to the two and adapted to be moved edgewise to closing position with relation to either nozzle, so that while one nozzle is connected with and delivering water to a hose, the valve may be moved to closing position on the other nozzle, and a second hose connected with the latter, without turning off the water in the hydrant, the shut-off valve being then moved edgewise away from the nozzle which is closed.

Such a shut-off valve is located on the inside of the hydrant casing, is normally out of closing relation to both nozzles, and is provided with manually operated means extending outside the hydrant casing, by which it may be moved edgewise into or out of closing position with relation to either nozzle.

When a hose is connected with one of the nozzles and it is desired to connect a hose to the other nozzle without turning off the water, the shut-off valve is moved to closing position over the latter nozzle and the outside nozzle cap is removed. The valve is held to its seat on the nozzle thus uncapped by the pressure of the water inside the hydrant casing. When the second hose is connected, the shut-off valve is moved edgewise back to its normal position so as to open communication between the hydrant casing and the hose.

The outer face of the valve, as well as the seat provided for it at each nozzle, must be such as to provide for close surface contact between the two to prevent leakage of water between them. The edgewise movement of the valve across its seat, from closing position with relation to the nozzle, is resisted by the pressure of the water behind the valve which forces the valve tightly against its seat. As a result wearing away of the face of the valve and of the nozzle valve seat and consequent leakage between the two frequently occurs, and in such cases it is difficult to connect a second nozzle to a hydrant unless the water be first turned off.

It is the object of the present invention to provide means coacting with the valve during its edgewise movements to avoid such wear and leakage.

In the accompanying drawing,—

Fig. 1 is a sectional elevation of a compression hydrant equipped with the present invention;

Fig. 2 is a side view of a portion of the same;

Fig. 3 is a horizontal section on the line 3 of Fig. 1;

Fig. 4 is a vertical section on the line 4 of Fig. 3.

Fig. 5 is a detail of the valve, and

Fig. 6 is a detail of the means for preventing wear of its face and of the valve seats of the hydrant nozzles.

Referring to said drawing 1 represents the hydrant casing, 2 its main valve, and 3, 4 its two nozzles, each normally closed by a cap 5. Between the nozzles 3, 4 there is provided inside the casing a shut-off disk valve 6, having a shank 7 provided with a squared opening 8 which fits over the corresponding shaped portion of a rod 9 journaled in and extending outside the casing and provided with a squared outer end for the reception of a wrench for turning it and moving valve 6 edgewise into and out of register with nozzles 3, 4. Valve 6 has a slight movement endwise, longitudinally of rod 9, for a purpose that will presently be stated. It is held yieldingly toward the surface of the hydrant casing by a spring 11 and is limited in its movement in the opposite direction by a collar 12 secured by a screw 13 on the inner end of rod 9.

A collar 14 is mounted on rod 9 between valve 6 and the inner surface of the hydrant casing, and this collar is provided with a hub 15 driven into the opening in the casing for rod 9 so as to be held against turning with the latter. Collar 14 is also provided with a radial lug 16, projecting upwardly therefrom behind valve 6, in the latter's normal (vertical) position. At its side edges this lug is provided with inclined portions 17 one of which, when the edgewise movement of valve 6 away from a nozzle is started, engages the valve at its shank 7, and, acting as a cam, forces it away from its seat on the nozzle, against the pressure of water inside the hydrant casing. The valve then rides along the face of lug 14 to normal (vertical) position, out of register with the nozzle 3 or 4, as the case may be, and throughout this movement it is out of contact with its seat at nozzle 3 or 4, with the result that there is no wear of the seat or of the face of the valve such as occurs when the valve is slid edgewise over and in contact with the seat in opening. The face of lug 14 is slightly concave and when the valve is in its normal or vertical position the shank 7 thereof will rest in this concave portion, being held there against edgewise movement by spring 11. In the movement of the valve from normal position to either of the nozzles, also, there is no grinding of the valve against its seat, because there is no contact between the two until the valve has been moved into alignment or register with the nozzle, the valve then sliding down the incline 17 and forced against its seat by the pressure of water in the hydrant. Edgewise movement of the valve to closing position with relation to nozzles 3, 4, is limited by stops 18.

What I claim is:

1. The combination with a hydrant provided with two nozzles having valve seats, of a valve mounted in the hydrant casing and movable edgewise thereon into and out of register with the valve seat of either nozzle and also movable endwise to and from the valve seat, manually operable means for so moving the valve edgewise, and means coacting with the valve during its edgewise movement out of register with the valve seat for moving it endwise away from the valve seat.

2. The combination with a hydrant provided with two nozzles having valve seats, of a valve mounted in the hydrant casing and movable edgewise thereon into and out of register with the valve seat of either nozzle and also movable endwise to and from the valve seat, manually operable means for so moving the valve edgewise, means coacting with the valve during its edgewise movement out of register with the valve seat for moving it endwise away from the valve seat, and means including a spring tending to produce an endwise movement of the valve toward the valve seats or toward the casing.

3. The combination with a hydrant provided with two nozzles having valve seats, of a valve mounted in the hydrant casing and movable edgewise thereon into and out of register with the valve seat of either nozzle and also movable endwise to and from the valve seat, manually operable means for so moving the valve edgewise, and a cam-shaped member coacting with the valve during its edgewise movement out of register with the valve seat for moving it endwise away from the valve seat during such edgewise movement.

4. The combination with a hydrant provided with two nozzles having valve seats, of a valve mounted in the hydrant casing and movable edgewise thereon into and out of register with the valve seat of either nozzle and also movable endwise to and from the valve seat, manually operable means for so moving the valve edgewise, a cam-shaped member coacting with the valve during its edgewise movement out of register with the valve seat for moving it endwise away from the valve seat during such edgewise movement, and a spring coacting with the valve and said cam-shaped member to hold the valve in normal position.

5. The combination with a hydrant provided with two nozzles having valve seats, of a valve mounted in the hydrant casing and movable edgewise into and out of register with the valve seat of either nozzle, manually operable means for moving the valve, a projection on the valve, and a member having a slightly recessed surface in which the projection may be seated and a spring tending to seat the projection in the member when the valve is out of register with either of the valve seats.

In testimony whereof, I have hereunto set my hand.

DENIS F. O'BRIEN.